(12) United States Patent
Zhang (10) Patent No.: US 8,934,886 B2
(45) Date of Patent: Jan. 13, 2015

(54) MOBILE APPARATUS AND METHOD OF VOICE COMMUNICATION

(71) Applicant: VIA Technologies, Inc., New Taipei (TW)

(72) Inventor: Guo-Feng Zhang, Shanghai (CN)

(73) Assignee: VIA Technologies, Inc., New Taipei (TW)

( * ) Notice: Subject to any disclaimer, the term of this patent is extended or adjusted under 35 U.S.C. 154(b) by 68 days.

(21) Appl. No.: 13/923,383

(22) Filed: Jun. 21, 2013

(65) Prior Publication Data

US 2014/0187211 A1 Jul. 3, 2014

(30) Foreign Application Priority Data

| Dec. 31, 2012 | (CN) | 2012 1 0591129 |
| Dec. 31, 2012 | (CN) | 2012 1 0592490 |
| Dec. 31, 2012 | (CN) | 2012 1 0593061 |
| May 17, 2013 | (CN) | 2013 1 0182846 |
| May 17, 2013 | (CN) | 2013 1 0182848 |
| May 17, 2013 | (CN) | 2013 1 0183217 |

(51) Int. Cl.
| H04M 3/00 | (2006.01) |
| H04M 1/27 | (2006.01) |
| H04W 8/24 | (2009.01) |
| H04L 29/08 | (2006.01) |
| H04M 1/725 | (2006.01) |

(52) U.S. Cl.
CPC .............. *H04M 1/271* (2013.01); *H04W 8/245* (2013.01); *H04L 29/08108* (2013.01); *H04M 1/72519* (2013.01)
USPC ..................... 455/418; 455/414.1; 455/550.1; 709/205

(58) Field of Classification Search
CPC ........... H04W 8/245; H04L 29/08108; H04M 1/75192; G06Q 10/10
USPC ..................... 455/418, 414.1, 550.1; 709/205
See application file for complete search history.

(56) References Cited

U.S. PATENT DOCUMENTS

2007/0097429 A1* 5/2007 Asada ........................ 358/1.15
2007/0124058 A1* 5/2007 Kitagawa et al. ............. 701/200
(Continued)

FOREIGN PATENT DOCUMENTS

CN 102413237 4/2012

OTHER PUBLICATIONS

"Office Action of China Counterpart Application", issued on Jun. 30, 2014, p. 1.

*Primary Examiner* — Danh Le
(74) *Attorney, Agent, or Firm* — Jianq Chyun IP Office (57) ABSTRACT

The invention provides a mobile apparatus, adapted to communicate with a cloud server. The mobile apparatus includes a voice system, a communication module, and a processing unit. The processing unit is coupled to the communication module and the voice system. The communication module transmits the first voice signal to the cloud server. The cloud server parses the first voice signal to obtain a communication target and a communication instruction. The processing unit receives the communication target and searches an address book in the mobile apparatus according to the communication target for obtaining a selection list conforming with the communication target. When the voice system receives the second voice signal, the second voice signal and the selection list are transmitted to the cloud server simultaneously by the communication module for generating a selection target, and the processing unit receives and executes the communication instruction and the selection target.

21 Claims, 7 Drawing Sheets

(56) References Cited

U.S. PATENT DOCUMENTS

| | | | |
|---|---|---|---|
| 2008/0155057 A1* | 6/2008 | Khedouri et al. | 709/217 |
| 2011/0007901 A1* | 1/2011 | Ikeda et al. | 380/270 |
| 2011/0304685 A1* | 12/2011 | Khedouri et al. | 348/14.02 |
| 2013/0219290 A1* | 8/2013 | Kim | 715/748 |
| 2013/0225214 A1* | 8/2013 | Enomoto | 455/466 |
| 2013/0262578 A1* | 10/2013 | Kim | 709/204 |

* cited by examiner

MOBILE APPARATUS AND METHOD OF VOICE COMMUNICATION

CROSS-REFERENCE TO RELATED APPLICATION

This application claims the priority benefit of China application serial no. 201210593061.4, filed on Dec. 31, 2012, China application serial no. 201210592490.X, filed on Dec. 31, 2012, China application serial no. 201210591129.5, filed on Dec. 31, 2012, China application serial no. 201310183217.6, filed on May 17, 2013, China application serial no. 201310182848.6, filed on May 17, 2013, and China application serial no. 201310182846.7, filed on May 17, 2013. The entirety of each of the above-mentioned patent applications is hereby incorporated by reference herein and made a part of this specification.

BACKGROUND

1. Technical Field

The invention relates to a voice control technique. Particularly, the invention relates to a mobile apparatus and a method of voice communication.

2. Related Art

With the development of technology, mobile apparatus having a voice system have been commonly used. The voice system is able to let users to communicate with the mobile apparatus through speech understanding technique. For example, the user may only need to speak out some requests, such as looking up the rail time, the weather or dialling a phone number, etc, and the voice system may take action according to voice from the user, which may be actions performed by answering the questions asked by the user through voice or driving the system of the mobile apparatus to turn on functions according to the instructions of the user.

However, in the processing of developing the voice system, some imperative problems to be resolved are encountered, such as the information security of the combination of the voice system and a cloud server, the convenience of turning on the voice system, etc.

As far as the information security of the combination of the voice system and the cloud server is concerned, currently, the complicated speech processing process requiring powerful computing capability is executed by the cloud server based on the concept of combining the voice system and the cloud server, by which the cost of the configuration for the hardware in the mobile apparatus can be heavily reduced. However, for such actions as requiring communicating through an address book, or sending a message, since it is necessary to upload the address book to the cloud server so as to search the communication or message receiving targets, the confidentiality of the address book is an important issue. Although it is likely to apply encrypted connections as well as instant and unreserved uploading method, it is still not easy for the user to eliminate the concerns over the aforementioned methods.

On the other hand, as far as the convenience of turning on the voice system is concerned, currently, the voice system is turned on mostly through touching of the application shown on the screen of the mobile apparatus or through touching of the physical buttons configured in the mobile apparatus. The aforementioned designs are both configured in the mobile apparatus itself, which is considerably not convenient. For example, when the mobile apparatus is placed in a pocket or in a bag whiling driving a car, or when the mobile apparatus placed in the living room whiling cooking in the kitchen and needing to ask about the details in the recipe by phone, or the like, the user is not able to touch the mobile apparatus instantly in the situation of requiring the voice system to be opened.

In addition, the sound amplifying feature in the mobile apparatus also has similar problems. Currently, the user turn on the sound amplifying feature by touching the screen through fingers, or by holding the cell phone closely to the ear through one hand. However, when being unavailable to touch the mobile apparatus instantly but requiring using the sound amplifying feature, it is not convenient for the user to use the current design.

Accordingly, how to improve the above disadvantages is one of the most imperative issues to be resolved.

SUMMARY

The invention is directed to a mobile apparatus and a method of voice communication, by which a voice service is provided much more quickly.

The invention also provides a mobile apparatus, adapted to communicate with a cloud server. The mobile apparatus includes a voice system, a communication module, and a processing unit. The processing unit is coupled to the communication module and the voice system. The communication module transmits the first voice signal to the cloud server. The cloud server parses the first voice signal to obtain a communication target and a communication instruction. The processing unit receives the communication target and searches an address book in the mobile apparatus according to the communication target for obtaining a selection list conforming with the communication target. When the voice system receives the second voice signal, the second voice signal and the selection list are transmitted to the cloud server simultaneously by the communication module for generating a selection target, and the processing unit receives and executes the communication instruction and the selection target.

The invention also provides a method of voice communication, adapted to a mobile apparatus. In the method, a first voice signal is received, and the first voice signal is transmitted to a cloud server. Next, a communication target obtained by parsing the first voice signal is received from the cloud server. Then, an address book in the mobile apparatus is searched according to the communication target for obtaining a selection list conforming with the communication target. Further, a second voice signal is received, and the second voice signal and the selection list are transmitted to the cloud server simultaneously. Finally, a communication instruction and a selection target are received from the cloud server and executed.

In view of the foregoing, by transmitting the selection list and the corresponding selection to the cloud server simultaneously, the quality of voice service is improved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Although the current mobile apparatus are able to provide a voice system for the user to communicate with the mobile apparatus through voice, the user still needs to touch mobile apparatus itself when turning on the voice system. Thus, when the user is not able to touch the mobile apparatus instantly but needs the voice system being turned on, the user cannot be satisfied with the instant demands. Therefore, the invention provides an assisting apparatus for turning on voice system and a method thereof, by which the user is able to turn on the voice system much more conveniently. In order to fully convey the spirit of the invention, embodiments are provided below for descriptions.

Figure 1:
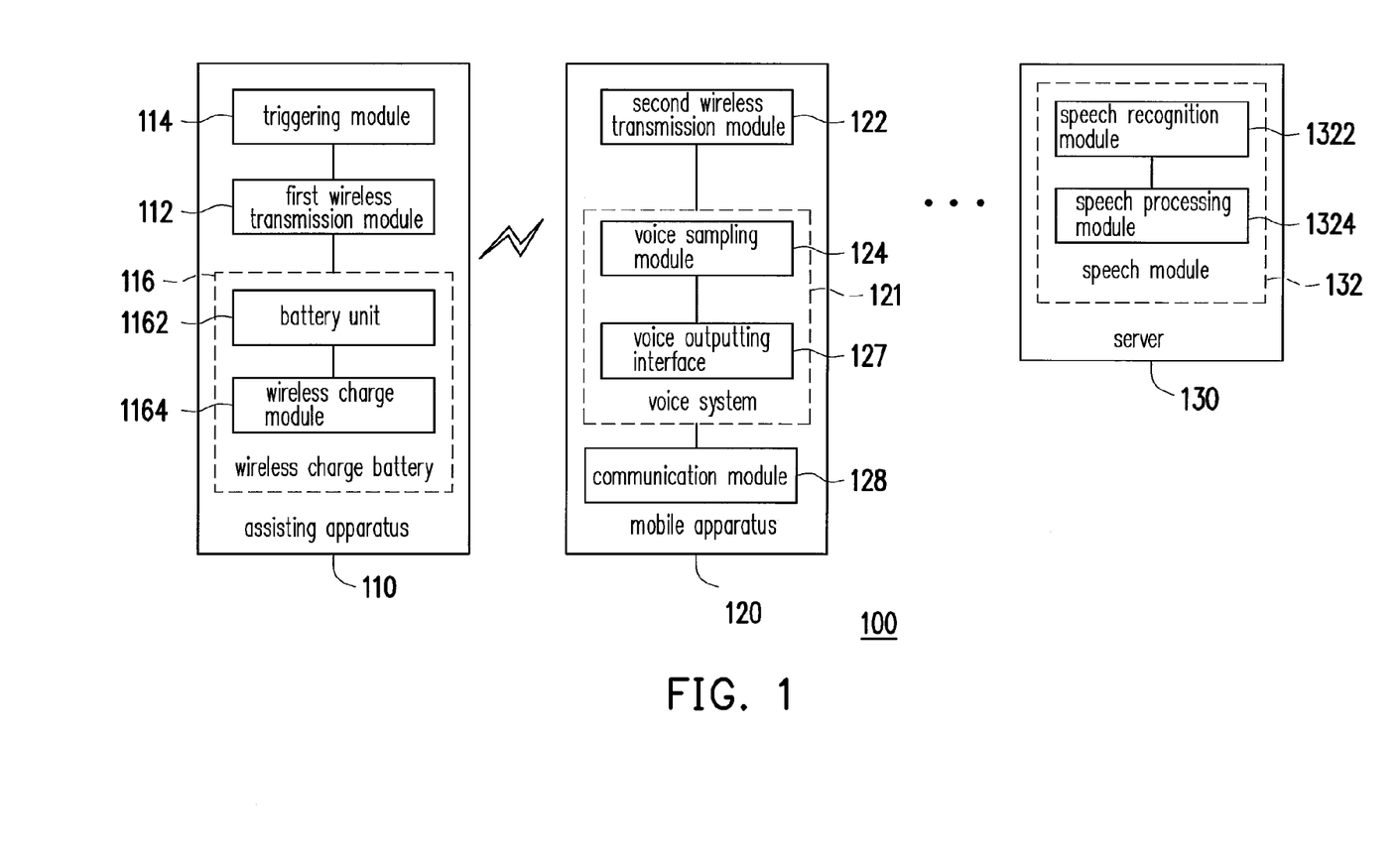
FIG. 1 is a schematic diagram of a voice operation system according to an embodiment of the invention.

FIG. 1 is a schematic diagram of a voice operation system according to an embodiment of the invention. Referring to FIG. 1, a voice operation system 100 includes an assisting apparatus 110 for turning on voice system, a mobile apparatus 120, and a server 130. In the present embodiment, the assisting apparatus 110 is able to turn on the voice system of the mobile apparatus 120 through a wireless transmitting signal so that the mobile apparatus 120 is able to communicate with the server 130 according to a voice signal.

Specifically, the assisting apparatus 110 includes a first wireless transmission module 112 and a triggering module 114. The triggering module 114 is coupled to the first wireless transmission module 112. The first wireless transmission module 112 is a device, which supports a wireless communication protocol, such as wireless fidelity (Wi-Fi), worldwide interoperability for microwave access (WiMAX), Bluetooth, ultra-wideband (UWB), or radio-frequency identification (RFID), etc, capable of transmitting wireless transmitting signals so as to correspond to another wireless transmission module and setup a wireless connection. The triggering module 114 may be, for example, a button or a key, etc. In the present embodiment, when the triggering module 114 is pressed by a user and generates a triggering signal, the first wireless transmission module 112 is turned on by receiving the triggering signal. By this time, the first wireless transmission module 112 generates a wireless transmitting signal and transmits the wireless transmitting signal to the mobile apparatus 120 through this first wireless transmission module 112. In one embodiment, the assisting apparatus 110 may be a bluetooth headset.

It should be noted that, although some existing hands-free headsets/microphones also have some features designed for turning on the mobile apparatus 120, in another embodiment according to the present invention, the assisting apparatus 110 may be different from to the above hands-free headsets/microphones. By connecting to the mobile apparatus, the above hands-free headsets/microphones mainly perform reception/communication instead of those reception/communication function of the mobile apparatus, and the function of the turning on the mobile apparatus is a auxiliary function. However, the assisting apparatus 110 in the present embodiment is mainly and "only" configured to turn on the voice system of the mobile apparatus 120 and does not equip with the function of reception/communication provided by the headsets, microphones, or a combination thereof. Therefore the interior circuit design of the assisting apparatus 110 may be simplified, and the cost of the assisting apparatus 110 may also be reduced. In other words, compared with the above hands-free headsets/microphones, the assisting apparatus 110 is an additional device. That is, the user may at the same time have both the above hands-free headsets/microphones and the assisting apparatus 110 of the present embodiment.

In addition, the form of the assisting apparatus 110 may be objects that are readily available for the user. For example, the assisting apparatus 110 may be a ring, a watch, a pair of earring, a necklace, a pair of glasses or other accessories, i.e. any kinds of portable objects, or installation elements, such as vehicle accessories configured on the steering wheel, not limited to the above. That is, the assisting apparatus 110 is a device that "goes into life style". By the interior system design of the assisting apparatus 110, the user may easily touch to the triggering module 114 so as to turn on the voice system. For example, when the form of the assisting apparatus 110 is a ring, the user may easily move his/her finger to press the triggering module 114 and have the triggering module 114 turned on. On the other hand, when the form of the assisting apparatus 110 is a vehicle accessory, the user may also easily have the triggering module 114 in the vehicle accessory turned on. In addition, compared to the headsets/microphones that cause uncomfortable while being worn, the assisting apparatus 110 in the present embodiment is capable of turning on the voice system in the mobile apparatus 120 and even further opening a sound amplifying feature (described hereinafter) so that the user may pick up the phone or talk on the phone through the mobile apparatus 120 directly without wearing the headsets/microphones. Furthermore, as far as the user is concerned, the assisting apparatus 110 that "goes into life style" are accessories to be worn or used, thus there are no problems with uncomfortability or unaccustomedness, without taking time to get used to. For example, when the user is cooking in the kitchen and would like to check the detail recipe by a mobile phone placed in the living room, if the user wears the ring-form assisting apparatus 110, such as a ring, a necklace or a watch, then the user may touch this ring, necklace or watch so as to turn on the voice system to ask friends about the recipe. Although some existing headsets/microphones having the feature of turning on voice system may also deal with the above tasks, the users may not wear headsets/microphones when they cook. Therefore it is not convenient.

In another embodiment, the assisting apparatus 110 may also be configured with a wireless charge battery 116 for driving the first wireless transmission module 112. More specifically, the wireless charge battery 116 includes a battery unit 1162 and a wireless charge module 1164. The wireless charge module 1164 is coupled to the battery unit. Herein, the wireless charge module 1164 is capable of receiving energy from a wireless power supply device (not shown) and transforming the energy to electricity so as to charge the battery unit 1162. As a result, the first wireless transmission module 112 of the assisting apparatus 110 may be charged conveniently through the wireless charge battery 116.

On the other hand, the mobile apparatus 120 is, for instance, a cell phone, a personal digital assistant (PDA), a smart phone, a pocket PC, a tablet PC, or a notebook computer where communication software is already installed. In brief, the mobile apparatus 120 may be any portable mobile apparatus capable of performing communication functions, and the type of the mobile apparatus 120 is not limited in the present embodiment. Additionally, the mobile apparatus 120 may be operated in, for example, Android, Microsoft, or Linux operating system, etc, and the type of the operating system is not limited in the present embodiment.

The mobile apparatus 120 includes a second wireless transmission module 122. The second wireless transmission module 122 matches the first wireless transmission module 112 in the assisting apparatus 110 and uses the corresponding wireless communication protocol, such as Wi-Fi, WiMAX, Bluetooth, UWB, or RFID, etc, so as to setup a wireless connection with the first wireless transmission module 112. It should be noted that, terms such as the "first" wireless transmission module 112 and the "second" wireless transmission module 122 are used for purposes of illustration that these wireless transmission modules are configured in different apparatus respectively, and the "first" wireless transmission module 112 and the "second" wireless transmission module 122 should not be construed as giving the limitation on the present embodiment.

In another embodiment, the mobile apparatus 120 further includes a voice system 121. The voice system 121 is coupled to the second wireless transmission module 122 so that the voice system 121 is turned on through the first wireless transmission module 112 and the second wireless transmission module 122 when the triggering module 114 in the assisting apparatus 110 is turned on by the user. In another embodiment, the voice system 121 may includes a voice sampling module 124 and a voice outputting interface 127. The voice sampling module 124 is configured to receive voice signals from the user. The voice sampling module 124 is, for example, a microphone, or other devices for receiving voice signals. The voice outputting interface 127 is, for example, a speaker or an headset, etc.

In addition, the mobile apparatus 120 further includes a communication module 128. The communication module 128 may be a device, such as a RF transceiver, for transmitting and receiving wireless signals. More specifically, the communication module 128 may provides the user with the service of answering or making a call or other services provided by telecommunications companies. In the present embodiment, the communication module 128 may receive an answering information from the server 130 through the Internet and setup a communication connection between the mobile apparatus 120 and another mobile apparatus (not shown) according to the answering information.

The server 130 is, for example, a web server or a cloud server, etc. The server 130 includes a speech module 132. In the present embodiment, the speech module 132 includes a speech recognition module 1322 and a speech processing module 1324. The speech processing module 1324 is coupled to the speech recognition module 1322. Herein, the speech recognition module 1322 is capable of receiving the voice signal from the voice sampling module 124 so as to transform the voice signal into a plurality of segment meanings, such as words or phrases. The speech processing module 1324 may parse the segment meanings to get the sense of the meanings, such as the intentions, time, places, etc, indicated from the segment meanings respectively and further determine the meanings indicated in the voice signal. In addition, the speech processing module 1324 may generate the answering information according to the result of parsing the segment meanings. In the present embodiment, the speech module 132 may be an independent chip or circuit composed of one or more logic gates. The speech module 132 may also be implemented by program codes. It should be noted that, in another embodiment, the speech module 132 may be configured in a mobile apparatus 220, as shown in a voice operation system 200 of FIG. 2.

Figure 3:
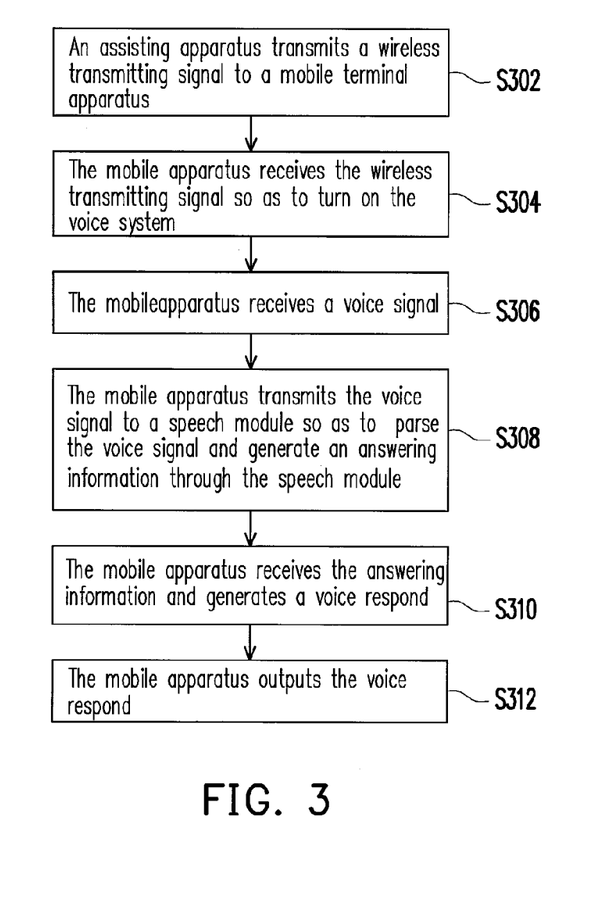
FIG. 3 is a flowchart illustrating a voice operation method according to an embodiment of the invention.

Steps of a voice operation method are described below with reference of the aforementioned voice operation system 100. FIG. 3 is a flowchart illustrating a voice operation method according to an embodiment of the invention. Referring to FIG. 1 and FIG. 3, in step S302, the assisting apparatus 110 transmits a wireless transmitting signal to the mobile apparatus 120. Specifically, when the first wireless transmission module 112 in the assisting apparatus 110 is triggered by receiving a triggering signal, the assisting apparatus 110 transmits the wireless transmitting signal to the mobile apparatus 120. Concretely speaking, when the triggering module 114 in the assisting apparatus 110 is pressed by the user, the triggering module 114 is triggered at this point due to this triggering signal, which would cause the first wireless transmission module 112 to transmit the wireless transmitting signal to the second wireless transmission module 122 in the mobile apparatus 120 so that the first wireless transmission module 112 can connect to the second wireless transmission module 122 through the wireless communication protocol. The assisting apparatus 110 is mainly and only configured to turn on the voice system 121 in the mobile apparatus 120 and does not equip with the function of answering or picking up a phone call; therefore, the interior circuit design of the assisting apparatus 110 may be simplified, and the cost of the assisting apparatus 110 may also be reduced. In other words, in comparison with conventional mobile apparatus equipped with hands-free headsets/microphones, the function of assisting to turn on voice system 110 is an auxiliary function. That is, the user may at the same time have both the above hands-free headsets/microphones and the assisting apparatus 110 of the present embodiment.

It is worth noting that the form of the assisting apparatus 110 may be objects that are readily available for the user. For example, the assisting apparatus 110 may be a ring, a watch, a pair of earrings, a necklace, a pair of glasses or other accessories, i.e. any kinds of portable objects, or installation elements, such as vehicle accessories configured on the steering wheel, not limited to the above. That is, the assisting apparatus 110 is a device that "goes into life style". By the interior system design of the assisting apparatus 110, the user may easily touch to the triggering module 114 so as to turn on the voice system 121. Therefore, the assisting apparatus 110 in the present embodiment is capable of turning on the voice system 121 in the mobile apparatus 120 and even further opening a sound amplifying feature (described hereinafter) so that the user may pick up the phone or talk on the phone through the mobile apparatus 120 directly without wearing the headsets/microphones. Furthermore, as far as the user is concerned, the assisting apparatus 110 that "goes into life style" are accessories to be worn or used, thus there are no problems with uncomfortability or unaccustomedness.

Moreover, the first wireless transmission module 112 and the second wireless transmission module 122 may run in a sleeping mode or an operating mode. The sleeping mode indicates that the wireless transmission module is in a turned-off situation. That is, the wireless transmission module will not receive or detect the wireless transmitting signal and will not connect to other wireless transmission modules. The operating mode indicates that the wireless transmission module is in a turned-on situation. That is, the wireless transmission module will detect the wireless transmitting signal continuously or transmit the wireless transmitting signal at any time so that the wireless transmission module is able to connect to other wireless transmission modules. Herein, when the triggering module 114 is triggered, if the first wireless transmission module 112 runs in the sleeping mode, then the triggering module 114 wakes up the first wireless transmission module 112 so that the first wireless transmission module 112 runs in the operating mode. Also, the triggering module 114 will have the first wireless transmission module 112 transmit the wireless transmitting signal to the second wireless transmission module 122 so that the first wireless transmission module 112 connects to the second wireless transmission module 122 of the mobile apparatus 120 through the wireless communication protocol.

On the other hand, in order to prevent an excessive power consumption caused by the first wireless transmission module 112 for keeping running in the operating mode, during a predetermined time (e.g. 5 minutes) after the first wireless transmission module 112 runs in the operating mode, if the triggering module 114 is not triggered again, then the first wireless transmission module 112 will run in the sleeping mode from the operating mode and stop connecting to the second wireless transmission module 122 of the mobile apparatus 120.

Next, in step S304, the second wireless transmission module 122 of the mobile apparatus 120 receives the wireless transmitting signal so as to turn on the voice system 121. Then, in step S306, when the second wireless transmission module 122 detects the wireless transmitting signal, the mobile apparatus 120 will turn on the voice system 121, and the voice sampling module 124 in the voice system 121 will begin to receive the voice signal, such as "What's the temperature today?", "Please make a phone call to Mr. Wang.", or "Please look up a phone number.", etc.

In step S308, the voice sampling module 124 transmits the voice signal to the speech module 132 in the server 130 so as to parse the voice signal and generate the answering information through the speech module 132. Specifically, the speech recognition module 1322 in the speech module 132 will receive the voice signal from the voice sampling module 124 and divide the voice signal into several segment meanings. The speech processing module 1324 will perform the semantic understanding about these segment meanings so as to generate the answering information.

In another embodiment, the mobile apparatus 120 may further receive the answering information generated by the speech processing module 1324 and output the content in the answering information through the voice outputting interface 127 or execute the commands in the answering information. In step S310, the mobile apparatus 120 receives the answering information generated by the speech module 132 and generate a voice respond according to the content (e.g. words or phrases, etc) in the answering information. Also, in step S312, the voice outputting interface 127 receives and outputs the voice respond.

For example, when the user press the triggering module 114 in the assisting apparatus 110, the first wireless transmission module 112 then transmits the wireless transmitting signal to the second wireless transmission module 122 so as to make the mobile apparatus 120 turn on the voice sampling module 124 in the voice system 121. Herein, suppose that the voice signal from the user is an interrogative sentence, such as "What's the temperature today?", and the voice sampling module 124 will receive and transmit this voice signal to the speech module 132 in the server 130 for parsing. The speech module 132 may transmit the answering information after parsing the voice signal back to the mobile apparatus 120. If the content in the answering information generated by the speech module 132 corresponds to "30 t", then the voice outputting interface 127 will output this voice respond (e.g. "30 t") to the user.

In another embodiment, suppose that the voice signal from the user is an imperative sentence, such as "Please make a phone call to Mr. Wang.", and the speech module 132 may distinguish that this imperative sentence is "a request for calling to Mr. Wang". Moreover, the speech module 132 may generate a new answering information again, such as "Please confirm to call to Mr. Wang", and transmit this new answering information to the mobile apparatus 120. Herein, the voice outputting interface 127 may also output this new answering information to the user. More specifically, when the respond made by the user is "Yes." or other similar positive answers, likewise, the voice sampling module 124 may receive and transmit the voice signal (e.g. "Yes") to the server 130 for being parsed by the speech module 132. After the speech module 132 finishing parsing the voice signal, the speech module 132 may generate a dialling commend information saved in the answering information and transmit this answering information to the mobile apparatus 120. Herein, the communication module 128 may look up the phone number of "Mr. Wang" according to a contact catalog stored in a phone number database so as to setup a communication connection between the mobile apparatus 120 and another electronic apparatus. That is, the communication module 128 will make a phone call to Mr. Wang.

Figure 2:
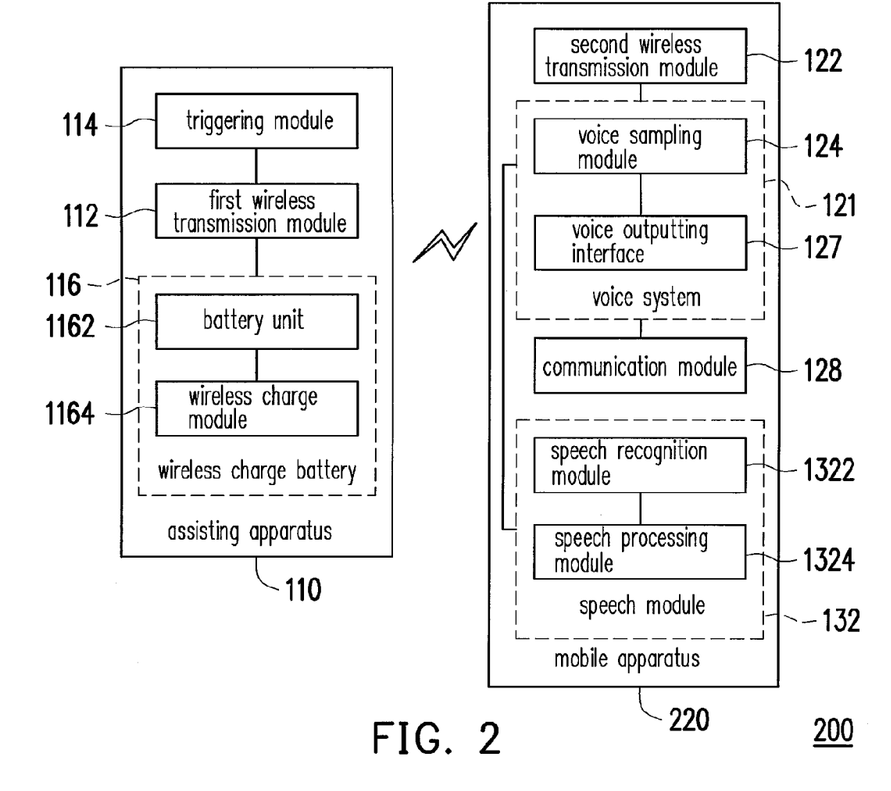
FIG. 2 is a schematic diagram of a voice operation system according to another embodiment of the invention.

In another embodiment, besides using the aforementioned voice operation system 100, the voice operation system 200 or other similar system may also undergo the aforementioned voice operation method, not limited to the above.

To sum up, in the voice operation system and the voice operation method as discussed in the above embodiments, the assisting apparatus is capable of turning on the voice system in the mobile apparatus wirelessly. Additionally, the form of the assisting apparatus may be objects that are readily available for the user and "going into life style", such as a ring, a watch, a pair of earrings, a necklace, a pair of glasses or other accessories, i.e. any kinds of portable objects, or installation elements, such as vehicle accessories configured on the steering wheel, not limited to the above. Accordingly, compared with the existing hands-free headsets/microphones which cause uncomfortability or unaccustomedness during wearing, it is more convenient to use the assisting apparatus 110 in the present embodiment to turn on the voice system in the mobile apparatus 120.

It is worth noting that the server 130 that includes the speech module may be a web server or a cloud server. The cloud server may cause problems concerning the privacy of the user. For example, the user needs to upload the whole address book to the cloud server so as to complete operations, such as dialling a phone call, sending a message, or other operations referring the address book. Even though the cloud server applies encrypted connections as well as instant and unreserved uploading method, it is still not easy for the user to eliminate the above concerns. Therefore, the invention provides another voice operation method and a corresponding voice interaction system so that the mobile apparatus is capable of providing the voice interaction service with the cloud server without uploading the whole address book. In order to fully convey the spirit of the invention, embodiments are provided below for descriptions.

Figure 4:
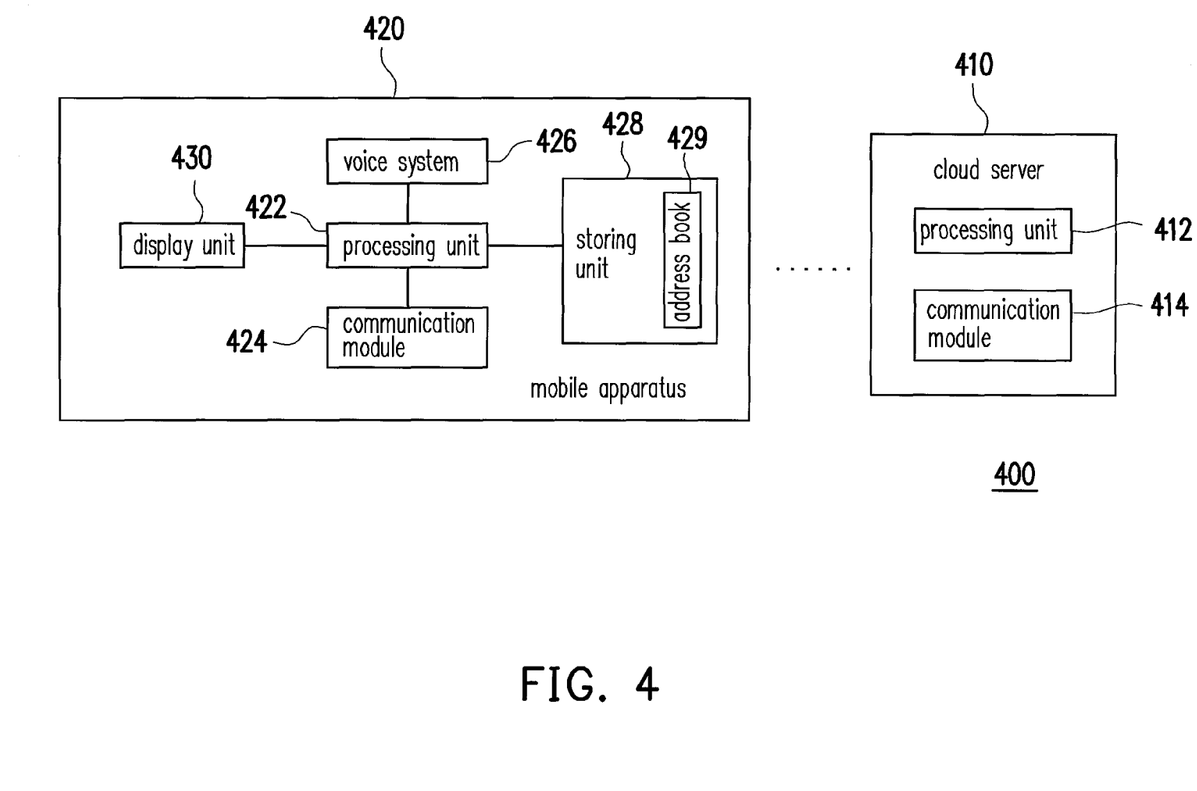
FIG. 4 is a schematic diagram of a voice interaction system according to an embodiment of the invention.

FIG. 4 is a schematic diagram of a voice interaction system according to an embodiment of the invention. Referring to FIG. 4, a voice interaction system 400 includes a cloud server 410 and a mobile apparatus 420. The cloud server 410 and the mobile apparatus 420 can be connected with each other. The voice interaction system 400 performs the service of voice interaction through the cloud server 410. That is, the cloud server 410, which has a powerful computing capability, performs the process of speech recognition. By this way, the data processing load of the mobile apparatus 420 may be reduced, and the accuracy and the recognition speed of the speech recognition may also be enhanced.

In the mobile apparatus 420, the mobile apparatus 420 includes a processing unit 422, a communication module 424, a voice system 426, and a storing unit 428. In an embodiment, the mobile apparatus 420 also includes a display unit 430. The processing unit 422 is coupled to the communication module 424, the voice system 426, the storing unit 428 and the display unit 430. The storing unit 428 further stores an address book 429.

The processing unit 422 is a hardware (e.g. a chipset, a processor and set forth) having computing capability for controlling the entire operation of the mobile apparatus 420. The processing unit 422 is, for example, a central processing unit (CPU) or any other programmable microprocessor or digital signal processor (DSP), programmable controller, application specific integrated circuits (ASIC), programmable logic device (PLD) or the like.

The communication module 424 is, for example, a network interface card which is capable of communicating with the cloud server 410 through cable transmission or wireless transmission. The voice system 426 at least includes a microphone or the like for transforming the voice into electronic signals. The storing unit 428 may be a random access memory (RAM), a read-only memory (ROM), a flash memory, or a magnetic disk storage device, etc. The display unit 430 may be a liquid crystal display (LCD) or a touch screen having a touch module, etc.

On the other hand, the cloud server 410 is a physical host having a powerful computing capability, or a super virtual computer consisting of a group of physical hosts for executing heavy tasks. Herein, the cloud server 410 includes a processing unit 412 and a communication module 414. Herein, the communication module 414 of the cloud server 410 is coupled the processing unit 412. The communication module 414 is configured to communicate with the communication module 424 of the mobile apparatus 420. The communication module 414 is, for example, a network interface card, which is capable of communicating with the mobile apparatus 420 through cable transmission or wireless transmission.

In addition, the processing unit 412 in the cloud server 410 has a more powerful computing capability, which is, for example, a multi-core CPU or a CPU array consisting of a plurality of CPUs. The processing unit 412 in the cloud server 410 at least includes, for example, the speech module 132 as shown in FIG. 1. The processing unit 412 may analyze voice signals received from the mobile apparatus 420 through the speech module. The cloud server 410 may transmit the parsing result to the mobile apparatus 420 through the communication module 414 so that the mobile apparatus 420 may execute the corresponding action according the result of the analyzation.

A voice communication workflow applied to a voice interaction system is described below with reference of the aforementioned FIG. 4.

Figure 5:
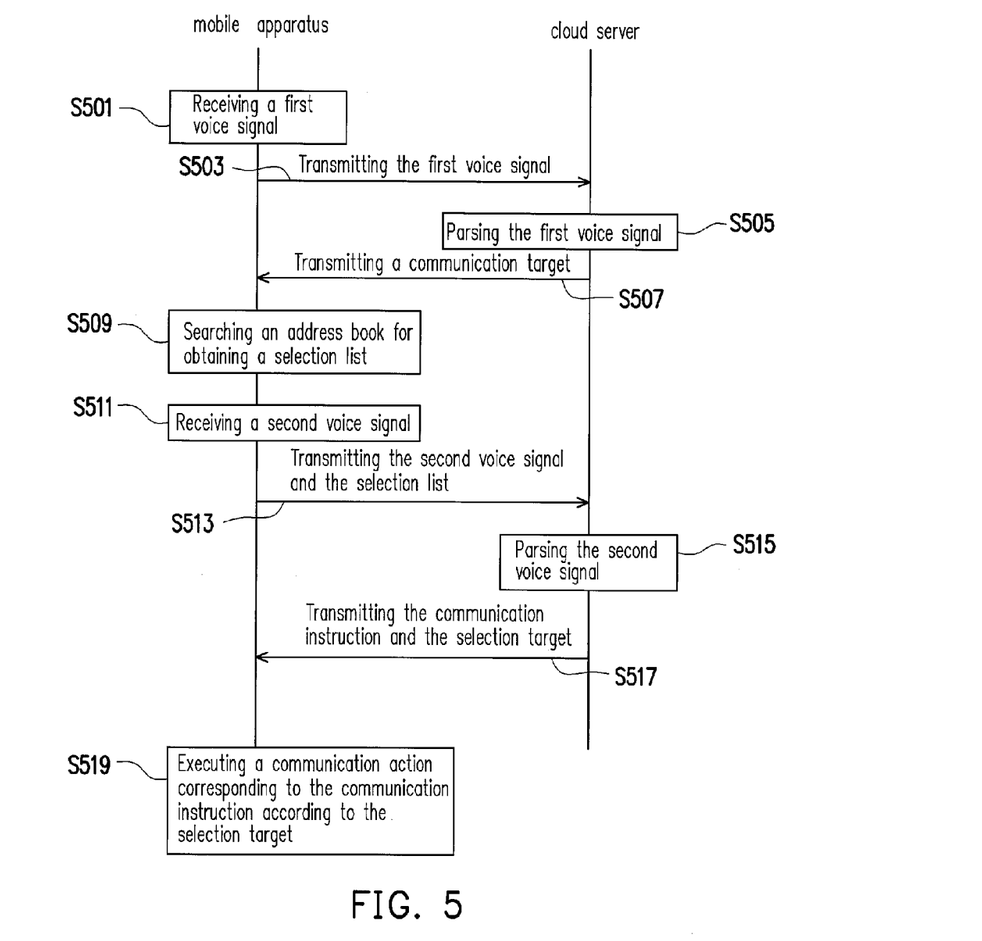
FIG. 5 is a diagram illustrating a voice communication workflow applied to a voice interaction system.

FIG. 5 is a diagram illustrating a voice communication workflow applied to a voice interaction system. Referring to FIG. 4 and FIG. 5, in step S501, in the mobile apparatus 420, a first voice signal is received by the voice system 426. In step S503, the first voice signal is transmitted to the cloud server 410 by the communication module 424. Herein, the mobile apparatus 420 receives the first voice signal from the user through, for example, microphones or the like, in the voice system 426. To illustrate, suppose the mobile apparatus 420 is a cell phone and the user is speaking "Please make a phone call to Mr. Wang." to the cell phone, then after the voice system 426 receives this voice signal of "Please make a phone call to Mr. Wang.", the voice system 426 will transmit this voice signal of "Please make a phone call to Mr. Wang." to the cloud server 410 through the communication module 424. In an embodiment, the voice system 426 may be turned on by the assisting apparatus as shown in FIG. 1 to FIG. 3.

Next, in step S505, in the cloud server 410, the processing unit 412 parses the first voice signal through the speech module. In step S507, the processing unit 412 transmits a communication target obtained by parsing the first voice signal to the mobile apparatus 420 through the communication module 414. Take the content of "Please make a phone call to Mr. Wang." in the first voice signal as an example, the processing unit 412 in the cloud server 410 may use the speech module to parse the first voice signal so as to obtain a communication instruction and a communication target. That is, the speech module may parse that the first voice signal includes "make a phone call" and "Mr. Wang". Thus, the processing unit 412 in the cloud server 410 may determine that the communication instruction is a dialling command and that the communication target is "Mr. Wang". Then, the processing unit 412 may transmit the communication instruction and the communication target to the mobile apparatus 420 through the communication module 414.

After that, in step S509, in the mobile apparatus 420, the processing unit 422 in the mobile apparatus 420 searches the address book 429 in the storing unit 428 according to the communication target for obtaining a searching result and inputs contact information based on the searching result to a selection list conforming with the communication target. For example, during the process of the searching, the processing unit 422 in the mobile apparatus 420 may find a plurality of contact information with "Wang" and thus generate the selection list, which is also displayed in the display unit 430 for the user to make a selection.

For example, the selection list is illustrated as shown in the following Table 1, including the contact information conforming with the communication target "Mr. Wang" and found in the address book. In this example, suppose there are four records of contact information founded, and the contact information and the contact name, i.e. "Wang, Tsung-Ming", "Wang, Wu", "Wang, An-Shi" and "Wang, Wei", are written in the selection list.

TABLE 1

| Selection List | |
|---|---|
| 1 | Wang, Tsung-Ming |
| 2 | Wang, Wu |
| 3 | Wang, An-Shi |
| 4 | Wang, Wei |

If the user is speaking to the mobile apparatus 420, as shown in step S511, the mobile apparatus 420 will receive a second voice signal through the voice system 426. While the mobile apparatus 420 receives the second voice signal, in step S513, the mobile apparatus 420 transmits the second voice signal and the selection list to the cloud server 410 simultaneously by the communication module 424. For example, after seeing the selection list, the user may say "the first record" or "Wang, Tsung-Ming" or the like to the mobile apparatus 420. When this second voice signal is formed, the mobile apparatus 420 may transmit the second voice signal and the selection list simultaneously to the cloud server 410.

In addition, the user may also say other contents randomly. That is, no matter what the user says, as long as the mobile apparatus 420 receives the second voice signal, the mobile apparatus 420 may transmit the second voice signal and the selection list simultaneously to the cloud server 410.

It should be noted that, in the present embodiment, the "whole" address book is not uploaded to the cloud server 410. Only what is conforming with the communication target in the form of the "selection list" is uploaded to the cloud server 410 for performing the parsing result of the second voice signal. In other words, only "a part of" the contact information will be uploaded. In an embodiment, the selection list uploaded to the cloud server 410 by the mobile apparatus 420 may only include one or more contact names without including phone numbers or other information. The content in the selection list to be uploaded can be set by the user on his/her demands.

Furthermore, it is worth noting that, in the present embodiment, the second voice signal and the selection list are transmitted simultaneously to the cloud server 410. Compared with the existing communication method that does not require uploading an address book and needs to analyze each voice signal and each table separately, the method of voice communication in the present embodiment in which one step only includes one information is much faster.

Then, in the cloud server 410, the processing unit 412 parses the second voice signal by the speech module, as shown in step S515. For example, suppose the content included in the second voice signal parsed by the speech module is "the third one", then the processing unit 412 in the cloud server 410 may further compare the third contact information of the selection list received by the mobile apparatus 420. Take Table 1 for example, the third contact information is "Wang, An-Shi".

It is worth noting that the user does not need to say the whole content in the selection list as the second voice signal with the design of the speech module 132 as shown in FIG. 1. Take the first record "Wang, Tsung-Ming" in the selection list shown in Table 1 for example, the user only needs to say a part of the content in the selection list, such as "the first record" or "Wang, Tsung-Ming", as the second voice signal, and with the uploading of the selection list to the speech module 132 in the cloud server 410, the selection target will be generated. In other words, the selection list includes a plurality of item information. Each item of information at least includes a reference number and a content corresponding to the reference number, such as names or phone numbers, etc, and the second voice signal is derived from the reference number or some of the content corresponding to the reference number.

After that, in step S517, the cloud server 410 transmits the communication instruction and the selection target to the mobile apparatus 420 through the communication module 414. In another embodiment, after finishing parsing the first voice signal in step S505, the cloud server 410 may also transmit the communication instruction to the mobile apparatus 420 for storing first and then transmit the selection target. Herein, the transmitting time for transmitting the communication instruction is not limited in the present embodiment.

After the mobile apparatus 420 receives the communication instruction and the selection target, in step S519, the mobile apparatus 420 executes the communication instruction and the selection target by the processing unit 422. The communication instruction may be, for example, an instruction requesting for dialling a number or sending a message or other instructions requesting for using the content in the address book 429, and the communication instruction is obtained by the cloud server 410 with the first voice signal. For example, suppose the content in the first voice signal is "Please make a phone call to Mr. Wang.", then the cloud server 410 may determine that the communication instruction is an instruction requesting for dialling a number based on "make a phone call". For another example, suppose the content in the first voice signal is "Please send a message to Mr. Wang.", then the cloud server 410 may determine that the communication instruction is an instruction requesting for sending a message based on "send a message". Besides, the selection target is obtained by the cloud server 410 with the second voice signal and the selection list. Take the selection list in Table 1 for example, suppose the content in the second voice signal is "the third", then the cloud server 410 may determine that the selection target is "Wang, An-Shi". For example, a phone call may be made to the selection target, or a transmitting interface may be turned on for sending a message to the selection target.

It is worth noting that the selection list obtained by the mobile apparatus 420 in step S509 may only include one or more contact names without phone numbers or other information. Therefore, when the mobile apparatus 420 receives the communication instruction and the selection target from the cloud server 410, the processing unit 422 in the mobile apparatus 420 may extract a phone number corresponding to the selection target from the address book 429 so as to execute a communication action corresponding to the communication instruction according to the phone number.

Moreover, in another embodiment, the selection list obtained by the mobile apparatus 420 in step S509 may also include contact names and the phone numbers at the same time or further include other information. Therefore, in step S515, the processing unit 412 in the cloud server 410 may obtain the phone number of the selection target according to the second voice signal and the selection list so as to transmit the communication instruction and the phone number to the mobile apparatus 420 in step S517. Accordingly, in step S519, the mobile apparatus 420 may execute a communication action corresponding to the communication instruction according to the phone number.

To sum up, in the aforementioned embodiments, the selection list generated from the first voice signal and the selection target generated from the second voice signal are uploaded simultaneously to the cloud server with powerful computing capability for performing the speech understanding process, wherein the selection list only includes some parts of the address book. Therefore, the voice interaction system as discussed in the above embodiments may maintain higher processing efficiency and better security.

On the other hand, it is worth noting that the above assisting apparatus solves the problems when the users is not able to touch the mobile apparatus instantly but requires for using the voice system, and thus the user may communicate with the mobile apparatus through the speech understanding technique. However, for the situation that requires for opening the sound amplifying feature, the sound amplifying feature is still turned on through touch of the mobile apparatus itself currently. When the user is not able to touch the mobile apparatus instantly but requires for using the sound amplifying feature, it is not convenient for the user to use the current design which needs to turn on the mobile apparatus itself. Therefore, the invention provides a method for opening a sound amplifying feature and a corresponding apparatus, by which the user is able to open the sound amplifying feature much more conveniently. In order to fully convey the spirit of the invention, embodiments are provided below for descriptions.

Figure 6:
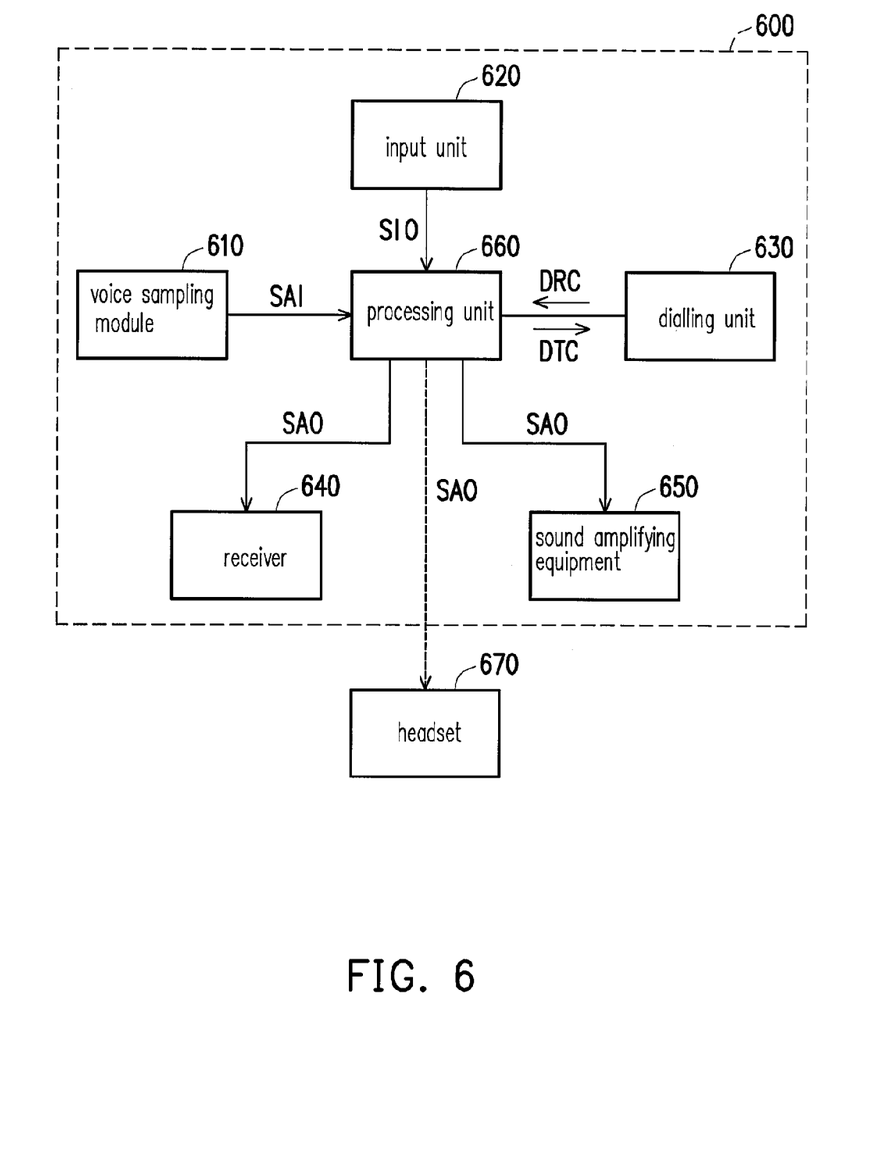
FIG. 6 is a schematic diagram of a mobile apparatus according to an embodiment of the invention.

FIG. 6 is a schematic diagram of a mobile apparatus according to an embodiment of the invention. Referring to FIG. 6, in the present embodiment, the mobile apparatus 600 includes a voice system, an input unit 620, a dialling unit 630, a receiver 640, a sound amplifying equipment 650, and a processing unit 660. In another embodiment of the present invention, the mobile apparatus 600 may further include a headset 670. The mobile apparatus 600 may be a cell phone or other similar electronic apparatus, such as the mobile apparatus 120 shown in FIG. 1. Details of the mobile apparatus 120 are described with reference of the aforementioned embodiments, and thus no further description is provided hereinafter. The processing unit 660 is coupled to a voice sampling module 610, the input unit 620, the dialling unit 630, the receiver 640, the sound amplifying equipment 650, and the headset 670. The voice system includes the voice sampling module 610. The voice sampling module 610 transforms sound into an input audio signal SAI, and the voice sampling module 610 may be a microphone or other similar electronic device. In other words, the voice sampling module 610 may be regarded as a component of the voice system. The voice system is similar to the voice system 121 as shown in FIG. 1. Details of the voice system 121 are described with reference of the aforementioned embodiments, and thus no further description is provided hereinafter. The input unit 620 provides an input operating signal SIO based on the operation provided by the user. The input unit 620 may be a key board, a touch panel or other similar electronic device. The above input operating signal is not from voice signal. The dialling unit 630 is controlled by the processing unit 660 for performing a dial function. The receiver 640, the sound amplifying equipment 650, and the headset 670 are configured to transform an output audio signal SAO provided by the processing unit 660 into sound and may be regarded as a sound output interface. The sound amplifying equipment 650 may be a speaker, etc. The headset 670 may be at least one of a wired headset or a wireless headset.

In view of the above, the voice system may be turned on by pressing a physical button, a control screen or the assisting apparatus according to the present invention. Under the situation of the voice system having been turned on, when the user is speaking to the mobile apparatus 600, sound may transform into an input audio signal SAI by the voice sampling module 610. The processing unit 660 may compare contact names, phone numbers or other information in the address book according to the input audio signal SAI. When the information in the address book conforms with the input audio signal SAI, the processing unit 660 may turn on the dial function of the dialling unit 630 as well as the sound amplifying equipment 650 so that the user is able to communicate with the contact after the phone is connected. Specifically, the processing unit 660 may transform the input audio signal SAI into an input string and compare the input string with a plurality of contact names, phone numbers or other information. When the input string conforms with one of the contact names, phone numbers or other information, the processing unit 660 may turn on the dial function of the dialling unit 630. On the contrary, when the input string does not conform with these contact names or phone numbers, the processing unit 660 may not turn on the dial function of the dialling unit 630.

In other words, in the present embodiment, when the processing unit 660 confirms that the input audio signal SAI conforms with the content in the address book, the processing unit 660 will provide an turn-on signal so as to open a sound amplifying feature for communication of the mobile apparatus 600. Specifically, the processing unit 660 may automatically provide an turn-on signal to the sound amplifying equipment 650, transform the input audio signal SAI into a communication transmitting data DTC, and transmit the communication transmitting data DTC through the dialling unit 630 to the contact person, i.e. another mobile apparatus (not shown). Meanwhile, the processing unit 660 may receive a communication receiving data DRC through the dialling unit 630 and provide the output audio signal SAO to the sound amplifying equipment 650 according to the communication receiving data DRC so as to transform the output audio signal SAO into sound which is outputted by amplifying.

It is worth noting that the current method for turning on a sound amplifying feature is performed by touching the mobile apparatus itself, which is, however, not convenient for the user when the sound amplifying feature is on request but unavailable for the user through touching the mobile apparatus instantly. Therefore, in the present embodiment, under the situation of the voice system having been turned on, the sound amplifying feature can further be turned on by the dial function through voice, which is convenient for the user to perform the communication.

In another embodiment, when the sound amplifying equipment 650 and the headset 670 are both coupled to the processing unit 660, if the input audio signal SAI from the voice sampling module 610 is provided to the processing unit 660, the processing unit 660 may set the mean of communication through the headset 670 as the first priority and the mean of communication through the sound amplifying equipment 650 as the second priority. In further embodiment, the processing unit 660 may set the mean of communication through the sound amplifying equipment 650 as the first priority and the mean of communication through the headset 670 as the second priority. The user sets those the mean of communications because the user may not contact with the mobile apparatus instantly, so the user set headset 670 or amplifying equipment 650 as the first priority of the mean of communication.

Additionally, in another embodiment, when the user provides the input operating signal SIO through the input unit 620, which means that the user does not have a problem with being unavailable to touch the mobile apparatus instantly, the output audio signal SAO may transmit to the receiver 640, the sound amplifying equipment 650, the headset 670 or other sound output interfaces determined by the predetermined outputting interface set by the user through the processing unit 660 and the dialling unit 630 after comparing the input operating signal SIO with the data in the address book.

For example, when the user says "Please make a phone call to Mr. Wang." to the mobile apparatus 600, the voice sampling module 610 may transform this voice into the input audio signal SAI after receiving the voice, and the input audio signal SAI is parsed by the speech module so that the communication instruction, such as "make a phone call", the communication target, such as "Mr. Wang", and further the selection target, such as "Wang, An-Shi" are obtained. Since the communication instruction is obtained from "voice", the processing unit 660 may automatically provide the turn-on signal to open the sound amplifying equipment 650 for the following communication. Namely, when the dialling unit 630 finishing dialling, the user may communicate with Mr. Wang directly through the sound amplifying equipment 650. In another example, when the user says "Pick up the phone.", the voice sampling module 610 may transform this voice into the input audio signal SAI after receiving the voice, and the input audio signal SAI is parsed by the speech module so that the communication instruction, such as "pick up the phone", is obtained. Since the communication instruction is obtained from "voice", the processing unit 660 may automatically provide the turn-on signal to open the sound amplifying equipment 650 so that the user may communicate with Mr. Wang directly through the sound amplifying equipment 650. Details and the configuration of the above speech module are described with reference of the aforementioned embodiments, and thus no further description is provided hereinafter. Moreover, the embodiments regarding the communication target and the selection target obtained finally may be referred to the aforementioned method for using the cloud server or other similar methods, and thus no further description is provided hereinafter. Of course, in view of the above, when the sound amplifying equipment 650 and the headset 670 present at the same time, the processing unit 660 may set the mean of communication through the headset 670 as the first priority and the mean of communication through the sound amplifying equipment 650 as the second priority according to the setting set by the user.

In another example, if the user selects "Wang, An-Shi" in the address book through the display unit 430 as shown in FIG. 4 by a button or way of touching, since the input operating signal SIO is provided by the input unit 620, the processing unit 660 may compare the input operating signal SIO with the data in the address book and transmit the output audio signal SAO to the receiver 640, the sound amplifying equipment 650, the headset 670 or other sound output interfaces through the processing unit 660 and the dialling unit 630 so that the user may communicate with Wang, An-Shi.

Figure 7:
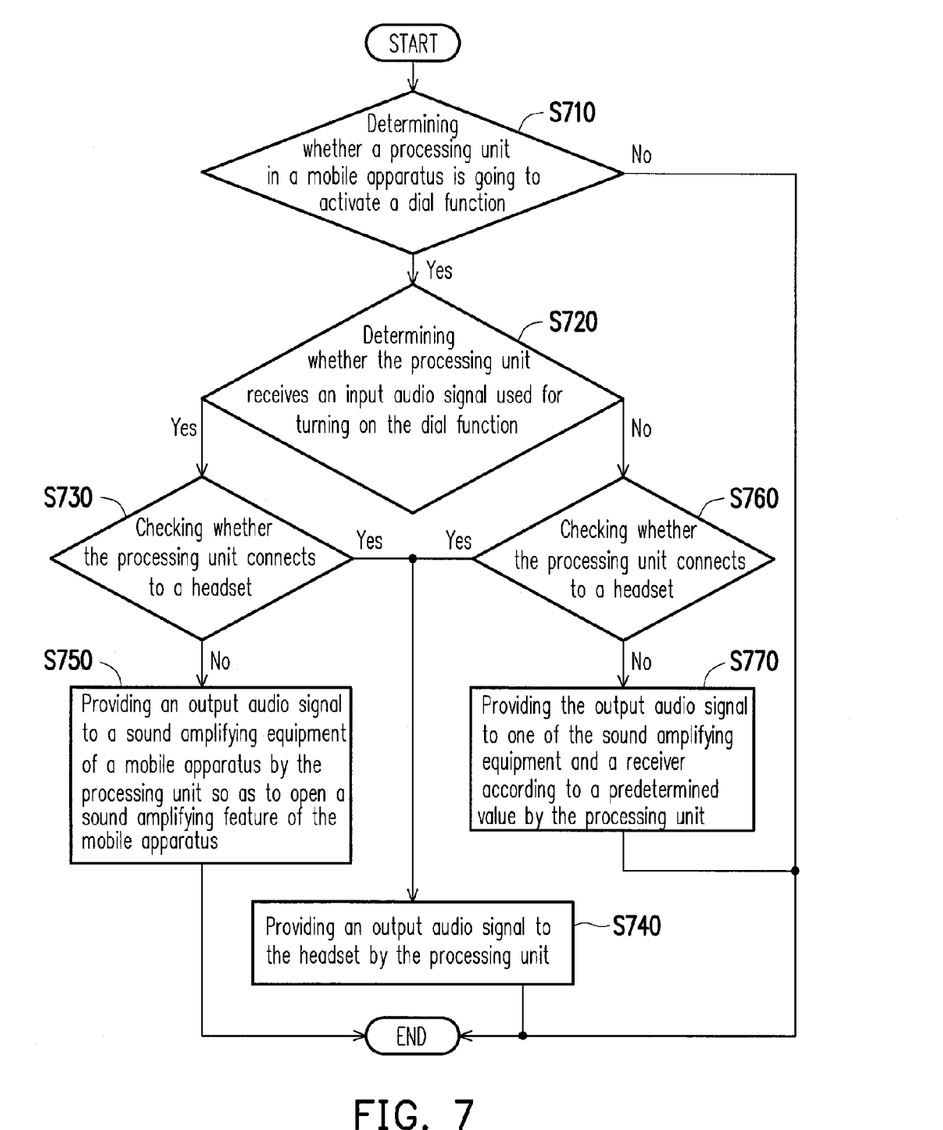
FIG. 7 is a flowchart illustrating a method for automatically opening a sound amplifying feature for communication of a mobile apparatus.

In view of the above, a method for automatically turning on a sound amplifying feature of the mobile apparatus may be provided. FIG. 7 is a flowchart illustrating a method for automatically opening a sound amplifying feature for communication of a mobile apparatus. Referring to FIG. 6 and FIG. 7, in the present embodiment, whether the dial function is to be turned on by the processing unit 660 in the mobile apparatus 600 is determined (step S710). In other words, the input operating signal SIO from the input unit 620 or the input audio signal SAI from the voice sampling module 610 may not necessarily be related to the dialling but possibly to other operations, such as opening the calculation feature in the mobile apparatus, or asking the weather through the voice system. When the processing unit 660 determines that the dial function of the dialling unit 630 is turned on according to an input signal which is related to a dial action, the result of the determination is "Yes" in step S710, and thus step S720 is performed. On the contrary, when the processing unit 660 determines that the dial function is not turned on according to the input signal, the result of the determination is "No" in step S710, and thus this method for automatically opening the sound amplifying feature for communication is ended.

Next, in step S720, whether the input audio signal SAI used for turning on the dial function is received by the processing unit 660 is determined. When the processing unit 660 receives the input audio signal SAI used for turning on the dial function; namely, the result of the determination is "Yes" in step S720, whether the processing unit 660 connects to the headset 670 is checked (step S730). When the processing unit 660 connects to the headset 670; namely, the result of the determination is "Yes" in step S730, the processing 660 is capable of automatically providing the turn-on signal to open the headset 670 and outputting the output audio signal SAO to the headset 670 (step S740). On the contrary, when the processing unit 660 does not connect to the headset 670; namely, the result of the determination is "No" in step S730, the processing 660 is capable of automatically providing the turn-on signal to open the sound amplifying equipment 650 and outputting the output audio signal SAO to the sound amplifying equipment 650 so as to turn on the sound amplifying feature for communication in the mobile apparatus 600 (step S750). It is worth noting that, when the processing unit 660 receives the input audio signal SAI used for opening the dial function, step S730 to step S750 stated above are performed in which the headset 670 is set as the first priority by the user for being the sound output interface if the sound amplifying equipment 650 and the headset 670 are both connected to the processing unit 660. In another embodiment, the user may also set the sound amplifying equipment 650 as the first priority by the user for being the sound output interface. Of course, when there is only one of the headset 670 and the sound amplifying equipment 650 connected to the processing unit 660, the one that is already connected may be set as the first priority by the user for being the sound output interface. The step stated above may be adjusted correspondingly according to the demand of the person having ordinary skill in the art.

On the other hand, when the processing unit 660 does not receive the input audio signal SAI used for opening the dial function from the voice sampling module 610; namely, the result of the determination is "No" in step S720, whether the processing unit 660 connects the headset 670 is checked (step S760). Specifically, when the processing unit 660 does not receive the input audio signal SAI from the voice sampling module 610 but is going to turn on the dial function, it indicates that the processing unit 660 receives the input operating signal SIO related to the dial action from the input unit 620. When the processing unit 660 connects the headset 670, namely, the result of the determination is "Yes" in step S760, the processing unit 660 is capable of automatically providing the turn-on signal to open the headset 670 and outputting the output audio signal SAO to the headset 670 (step S740). On the contrary, when the processing unit 660 does not connect to the headset 670; namely, the result of the determination is "No" in step S760, the processing 660 is capable of providing the output audio signal SAO to one of the sound amplifying equipment 650 and the receiver 640 (step S770) according to a predetermined value. The order of the steps stated above is for illustration, not limited in the present embodiment. It is worth noting that when the result of the determination is "Yes" in step S760, the output audio signal SAO is provided to the headset 670 in which the headset 670 is set as the first priority by the user for being the sound output interface if the receiver, the sound amplifying equipment 650 and the headset 670 are all connected to the processing unit 660. In another embodiment, the user may also set the receiver 640 or the sound amplifying equipment 650 as the first priority by the user for being the sound output interface. Of course, when there is only one of the receiver 640, the sound amplifying equipment 650, and the headset 670 connected to the processing unit 660, the one that is already connected may be set as the first priority by the user for being the sound output interface. The step stated above may be adjusted correspondingly according to the demand of the person having ordinary skill in the art.

To sum up, in the present invention of the mobile apparatus and the method for automatically turning on a sound amplifying feature of the mobile apparatus, when the processing unit receives the input audio signal used for turning on the dial function, the processing unit may further automatically turn on the sound amplifying feature in addition to opening the dial function and output the output audio signal to the sound amplifying equipment. Accordingly, when the user is not able to touch the mobile apparatus instantly or not able to wear headset but needs the sound amplifying feature, the user may turn on the sound amplifying feature through the voice system so as to enhance the convenience of using the mobile terminal.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A mobile apparatus, adapted to connect to a cloud server, the mobile apparatus comprises:
   a voice system, receiving a first voice signal and a second voice signal respectively;
   a communication module, transmitting the first voice signal and the second voice signal respectively; and
   a processing unit, coupled to the communication module and the voice system,
   wherein the communication module transmits the first voice signal to the cloud server, the cloud server parses the first voice signal to obtain a communication target and a communication instruction, the processing unit receives the communication target and searches an address book in the mobile apparatus according to the communication target for obtaining a selection list conforming with the communication target, when the voice system receives the second voice signal, the second voice signal and the selection list are transmitted to the cloud server simultaneously by the communication module for generating a selection target, and the processing unit receives and executes the communication instruction and the selection target.

2. The mobile apparatus as claimed in claim 1, wherein the communication instruction is an instruction requesting for using a content in the address book.

3. The mobile apparatus as claimed in claim 1, wherein the selection list includes a plurality of item information, each of item information includes a reference number and a content corresponding to the reference number, and the second voice signal is related to the reference number or some of the content corresponding to the reference number.

4. The mobile apparatus as claimed in claim 1, wherein the selection list includes some of a content in the address book according to the communication target.

5. The mobile apparatus as claimed in claim 1, further comprises:
   a display unit, configured to display the selection list for a user to make a selection and generate the second voice signal according to the selection.

6. The mobile apparatus as claimed in claim 1, wherein the cloud server obtains a phone number of the selection target according to the second voice signal and the selection list, and transmits the communication instruction and the phone number to the mobile apparatus so that the mobile apparatus executes a communication action corresponding to the communication instruction according to the phone number.

7. The mobile apparatus as claimed in claim 1, further comprising an assisting apparatus for turning on the voice system, and assisting apparatus with a triggering module is only configured to assist in turning on the voice system and does not equip with the function of headsets, microphones, or a combination thereof.

8. The mobile apparatus as claimed in claim 1, further comprising:
   a sound amplifying equipment, configured to transform an output audio signal, when the voice system is in a turn-on state and the processing unit receives the first voice signal related to a dial action provided by the voice system, the processing unit automatically provides an turn-on signal to open the sound amplifying equipment, and the output audio signal is provided to the sound amplifying equipment through the processing unit, wherein the output audio signal is related to the communication instruction and the selection target.

9. The mobile apparatus as claimed in claim 8, wherein the processing unit transforms the first voice signal into an input string and compares the input string with a plurality of contact names, when the input string conforms with one of the contact names, the processing unit turns on a dial function and opens the sound amplifying equipment, and when the input string does not conform with the contact names, the processing unit does not turn on the dial function and does not open the sound amplifying equipment.

10. A method of voice communication, for a mobile apparatus, comprises:
    receiving a first voice signal and transmitting the first voice signal to a cloud server;
    receiving a communication target obtained by parsing the first voice signal from the cloud server;
    searching an address book in the mobile apparatus according to the communication target for obtaining a selection list conforming with the communication target;
    receiving a second voice signal and transmitting the second voice signal and the selection list to the cloud server simultaneously; and
    receiving and executing a communication instruction and a selection target from the cloud server.

11. The method of voice communication as claimed in claim 10, wherein the communication instruction is an instruction requesting for using a content in the address book.

12. The method of voice communication as claimed in claim 10, wherein the selection list includes a plurality of item information, each of item information includes a reference number and a content corresponding to the reference number, and the second voice signal is related to the reference number or some of the content corresponding to the reference number.

13. The method of voice communication as claimed in claim 10, wherein the selection list includes some of a content in the address book according to the communication target.

14. The method of voice communication as claimed in claim 10, wherein the cloud server obtains the communication instruction according to the first voice signal, and the cloud server obtains the selection target according to the second voice signal and the selection list.

15. The method of voice communication as claimed in claim 10, wherein the step of searching the address book in the mobile apparatus according to the communication target for obtaining the selection list conforming with the communication target comprises:
    searching a contact information conforming with the communication target in the address book to obtain a searching result; and
    inputting the contact information into the selection list based on the searching result, wherein the contact information includes at least one contact name.

16. The method of voice communication as claimed in claim 10, wherein after the step of searching the address book in the mobile apparatus according to the communication target for obtaining the selection list conforming with the communication target, the method of voice communication further comprises:

displaying the selection list for a user to make a selection and generating the second voice signal according to the selection; and receiving the second voice signal.

17. The method of voice communication as claimed in claim 10, wherein after the step of receiving the second voice signal and transmitting the second voice signal and the selection list to the cloud server simultaneously, the method of voice communication further comprises:

receiving a phone number of the selection target from the server cloud so as to execute a communication action corresponding to the communication instruction according to the phone number.

18. The method of voice communication as claimed in claim 10, further comprises:

extracting a phone number corresponding to the selection target from the address book so as to execute a communication action corresponding to the communication instruction according to the phone number when the communication instruction and the selection target are received from the cloud server.

19. The method of voice communication as claimed in claim 10, further comprises:

using an assisting apparatus for turning on a voice system to receive a first/second voice signal, and assisting apparatus with a triggering module is only configured to assist in turning on the voice system and does not equip with the function of headsets, microphones, or a combination thereof.

20. The method of voice communication as claimed in claim 10, further comprises:

when a voice system in the terminal apparatus is in an opening state, a processing unit in the mobile apparatus determining whether the first voice signal related to a dial action is provided by the voice system; and when the first voice signal related to the dial action is provided by the voice system, the processing unit automatically providing an turn-on signal to open a sound amplifying equipment in the mobile apparatus and providing an output audio signal to the sound amplifying equipment through the processing unit, wherein the output audio signal is related to the communication instruction and the selection target.

21. The method of voice communication as claimed in claim 20, further comprises:

transforming the first voice signal into an input string and comparing the input string with a plurality of contact names;

when the input string conforms with one of the contact names, the first voice signal is related to the dial action, and the processing unit turns on a dial function and opens the sound amplifying equipment; and when the input string does not conform with the contact names, the first voice signal is not related to the dial action, and the processing unit does not turn on the dial function and does not open the sound amplifying equipment.

* * * * *